(12) United States Patent
Liu et al.

(10) Patent No.: US 11,578,564 B2
(45) Date of Patent: Feb. 14, 2023

(54) SYSTEMS AND METHODS FOR PREDICTING SHEAR FAILURE OF A ROCK FORMATION

(71) Applicant: Saudi Arabian Oil Company, Dhahran (SA)

(72) Inventors: Chao Liu, Houston, TX (US); Younane Abousleiman, Norman, OK (US); Hui-Hai Liu, Houston, TX (US); Yanhui Han, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 790 days.

(21) Appl. No.: 16/407,832

(22) Filed: May 9, 2019

(65) Prior Publication Data

US 2019/0369282 A1 Dec. 5, 2019

Related U.S. Application Data

(60) Provisional application No. 62/677,764, filed on May 30, 2018.

(51) Int. Cl.
| | |
|---|---|
| *G01V 1/28* | (2006.01) |
| *E21B 41/00* | (2006.01) |
| *G01V 1/50* | (2006.01) |

(52) U.S. Cl.
CPC .............. *E21B 41/00* (2013.01); *G01V 1/282* (2013.01); *G01V 1/284* (2013.01); *G01V 1/50* (2013.01); *G01V 2210/61* (2013.01)

(58) Field of Classification Search
CPC ....... G01V 1/50; G01V 1/282; G01V 2210/61
See application file for complete search history.

(56) References Cited

U.S. PATENT DOCUMENTS

| | | | |
|---|---|---|---|
| 5,345,819 A * | 9/1994 | Dearing, Jr. ........... | G01N 29/07 175/50 |
| 7,066,019 B1 | 6/2006 | Papanastasiou | |
| 8,301,425 B2 * | 10/2012 | Dale ....................... | E21B 49/00 703/10 |
| 8,374,836 B2 | 2/2013 | Yogeswaren | |

(Continued)

FOREIGN PATENT DOCUMENTS

CN 108071389 A 5/2018

OTHER PUBLICATIONS

International Search Report and Written Opinion for International Application No. PCT/US2019/034685 report dated Oct. 9, 2019; pp. 1-15.

(Continued)

*Primary Examiner* — Elias Desta
(74) *Attorney, Agent, or Firm* — Bracewell LLP; Constance G. Rhebergen; Keith R. Derrington

(57) ABSTRACT

Systems and methods for determining shear failure of a rock formation are disclosed. The method includes receiving, by a processor, a plurality of parameters related to physical properties of the rock formation, applying the plurality of parameters to a predetermined failure criterion, and determining shear failure of the rock formation based on the failure criterion. In some embodiments the failure criterion is a modified Hoek-Brown failure criterion that takes into consideration an intermediate principal stress, and the difference between normal stresses and an average confining stress.

15 Claims, 11 Drawing Sheets

(56) References Cited

U.S. PATENT DOCUMENTS

| | | | |
|---|---|---|---|
| 8,498,853 | B2 | 7/2013 | Crawford et al. |
| 9,465,140 | B2 | 10/2016 | Crawford |
| 9,835,746 | B2 | 12/2017 | Yan et al. |
| 2015/0168597 | A1 | 6/2015 | Bai |
| 2017/0058668 | A1 | 3/2017 | Paul |
| 2018/0058212 | A1 | 3/2018 | Ali et al. |
| 2019/0094413 | A1* | 3/2019 | Maerten ............... G01V 99/005 |

OTHER PUBLICATIONS

Ma et al., "A new modified Hoek-Brown failure criterion considering the effect of the intermediate principal stress and its applicability analysis", Transit Development in Rock Mechanics, 2015, pp. 559-564, Taylor & Francis Group, London.

Malama, "A three-dimensional criterion for rock mass failure", ARMA, 2005, pp. 12, American Rock Mechanics Association.

Rahimi et al., "Comparison of rock failure criteria in predicting borehole shear failure", International Journal of Rock Mechanics & Mining Sciences, 2015, pp. 29-40, Elsevier Ltd.

Caenn, Ryen et al.; "Composition and Properties of Drilling and Completion Fluids" 2016, 7th Edition: Gulf Professional Publishing; Chapter 9, p. 359.

Colmenares, L.B. et al.; "A statistical evaluation of intact rock failure criteria constrained by polyazial test data for five different rocks" International Journal of Rock Mechanics & Mining Sciences 39 (2002) 695-729.

Ewy, R.T.; "Wellbore-Stability Prediction by Use of a Modified Lade Criterion" SPE 56862, SPE Drill. & Completion 14 (2), Jun. 1999; pp. 85-91.

Hoek, Evert et al.; "Empirical Strength Criterion for Rock Masses" Journal of the Geotechnical Engineering Division, GT9, Sep. 1980; pp. 1013-1035.

Hoek, Evert et al.; "Practical estimates of rock mass strength" International Journal of Rock Mechanics & Mining Science 34(8); pp. 1-24.

Jaiswal, Ashok et al.; "A generalized three-dimensional failure criterion for rock masses" Journal of Rock Mechanics and Geotechnical Engineering 2012, 4 (4): pp. 333-343.

Liu, Chao et al.; "Multiporosity/Multipermeability Inclined-Wellbore Solutions With Mudcake Effects" SPE 191135, Society of Petroleum Engineers, Oct. 2018 SPE Journal; pp. 1723-1747.

Mogi, Kiyoo; "Fracture and Flow of Rocks under High Triaxial Compression" Journal of Geophysical Research, vol. 76, No. 5, Feb. 10, 1971; pp. 1255-1269.

Nguyen, Vinh X. et al.; "Poromechanics Response of Inclined Wellbore Geometry in Chemically Active Fractured Porous Media" Journal of Engineering Mechanics, vol. 135, No. 11, Nov. 1, 2009; pp. 1281-1294.

Pan, X.D. et al.; "A simplified three dimensional Hoek-Brown yield criterion" Rock Mechanics and Power Plants, Romana (ed.) 1988; pp. 95-103.

Priest, S.D.; "Determination of Shear Strength and Three-dimensional Yield Strength for the Hoek-Brown Criterion" Rock Mechanics and Rock Engineering (2005) 38 (4); pp. 299-327.

Santarelli, F.J. et al.; "Drilling Through Highly Fractured Formations: A Problem, a Model, and a Cure" SPE 24592, 67th Annual Technical Conference & Exhibition of the Society of Petroleum Engineers, Oct. 4-7, 1992; pp. 481-490.

Takahashi, M. et al.; "Effect of the intermediate principal stress on strength and deformation behavior of sedimentary rocks at depth shallower than 2000m" Rock at Great Depth, Maury & Fourmaintraux, 1989; pp. 19-26.

Zhang, L.; "A generalized three-dimensional Hoek-Brown strength criterion" Rock Mechanics and Rock Engineering (2008) 41: pp. 893-915.

Zhang, Lianyang et al.; "Evaluation of rock strength criteria for wellbore stability analysis" International Journal of Rock Mechanics & Mining Sciences 47 (2010) pp. 1304-1316.

Zan Yuewen et al., "Nonlinear unified strength criterion of rock", Chinese Journal of Rock Mechanics and Engineering, vol. 21(10), pp. 1435-1441, Oct. 2002. English Abstract.

* cited by examiner

SYSTEMS AND METHODS FOR PREDICTING SHEAR FAILURE OF A ROCK FORMATION

CROSS-REFERENCE TO RELATED APPLICATIONS

This application claims priority from U.S. Provisional Application No. 62/677,764, filed May 30, 2018, and titled "SYSTEMS AND METHODS FOR PREDICTING SHEAR FAILURE OF FRACTURED ROCKS," the entire contents of which is incorporated here by reference.

BACKGROUND

1. Technical Field

This disclosure relates generally to subsurface formations. More particularly the disclosure relates to methods and systems for predicting shear failure of a rock formation.

2. Description of Related Art

Understanding rock failure is essential in almost all projects related to subsurface rock formations. For example, such projects include design of tunnels, underground excavations in mining, and drilling in the oil and gas business. Many different criteria have been proposed to predict shear failure in rock formations, including Mohr-Coulomb criterion, Drucker-Prager criterion, Modified Lade criterion, and Hoek-Brown criterion.

SUMMARY

Wellbore instability problems in naturally fractured formations have been widely recorded in the oil and gas industry. The cost of drilling that is wasted due to wellbore instability problems is estimated to be around several billions of dollars per year. Some have theoretically shown that wellbore failure potential increases due to natural fractures. It is, therefore, essential to understand the failure behavior of naturally fractured rocks. The Mohr-Coulomb criterion generally underestimates rock strength because it does not account for the intermediate principal stress on rock strength enhancement. The Drucker-Prager criterion generally overestimates rock strength, and the modified Lade criterion can either overestimate or underestimate rock strength. The Hoek-Brown criterion has been widely used in the area of civil engineering projects, such as design of tunnels and underground excavations, and also in the oil and gas industry, such as to study wellbore stability. The Hoek-Brown criterion does not, however, consider the effects of intermediate principal stress on rock failure.

In one embodiment, a modified Hoek-Brown failure criterion is provided to predict shear failure of naturally fractured rocks. The new criterion takes into account the effects of natural fractures on rock strength degradation and also the intermediate principal stress on rock strength enhancement. Modified Hoek-Brown failure criterion reduces to the original Hoek-Brown failure criterion when the intermediate principal stress is equal to the minimal principal stress. Modified Hoek-Brown failure criterion also successfully captures the effects of the intermediate principal stress when the poly-axial tests are conducted with an intermediate principal stress larger than the minimal principal stress. Excellent matches are found between the modified Hoek-Brown failure criterion and poly-axial tests on various types of rocks. The modified Hoek-Brown failure criterion could help understand rock shear failure better and improve the design of tunnels and underground excavations.

The modified Hoek-Brown failure criterion is developed to predict shear failure of rocks with fractures or joints. It takes into account the effects of the intermediate principal stress on rock shear failure. Two terms are introduced in the modified Hoek-Brown failure criterion, that is, the difference between normal stresses and the average confining stress, and a weight term. To calculate the average confining stress, a weight term is introduced to distinguish the different contributions from the intermediate and the minimal principal stresses. According to the modified Hoek-Brown failure criterion, shear failure of rocks occurs when the difference between normal stresses reaches a critical value that is dependent on the unconfined compressive strength of the rock, rock matrix and fracture properties, and the average confining stress.

Accordingly, one embodiment is a method for determining shear failure of a rock formation. The method includes receiving, by a processor, a plurality of parameters related to physical properties of the rock formation, applying the plurality of parameters to a predetermined failure criterion, and determining shear failure of the rock formation based on the failure criterion. In some embodiments the failure criterion is a modified Hoek-Brown failure criterion that takes into consideration an intermediate principal stress, and the difference between normal stresses and an average confining stress.

Another embodiment is a system for determining shear failure of a rock formation. The system includes a processing unit, a memory unit in communication with the processing unit, the memory unit comprising program instructions that when executed by the processing unit cause the operations of receiving a plurality of parameters related to physical properties of the rock formation, applying the plurality of parameters to a predetermined failure criterion, and determining shear failure of the rock formation based on the failure criterion.

Another embodiment is a non-transitory computer readable medium comprising a computer program, that when executed by a processor, is configured to receive a plurality of parameters related to physical properties of the rock formation, apply the plurality of parameters to a predetermined failure criterion, and determine shear failure of the rock formation based on the failure criterion.

BRIEF DESCRIPTION OF THE DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

For simplicity and clarity of illustration, the drawing figures illustrate the general manner of construction, and descriptions and details of well-known features and techniques may be omitted to avoid unnecessarily obscuring the discussion of the described embodiments. Additionally, elements in the drawing figures are not necessarily drawn to scale. For example, the dimensions of some of the elements in the figures may be exaggerated relative to other elements to help improve understanding of the various embodiments. Like reference numerals refer to like elements throughout the specification.

DETAILED DESCRIPTION

The methods and systems of the present disclosure will now be described more fully herewith reference to the accompanying drawings in which embodiments are shown. The methods and systems of the present disclosure may be in many different forms and should not be construed as limited to the illustrated embodiments set forth here; rather, these embodiments are provided so that this disclosure will be thorough and complete, and will fully convey its scope to those skilled in the art.

Figure 1:
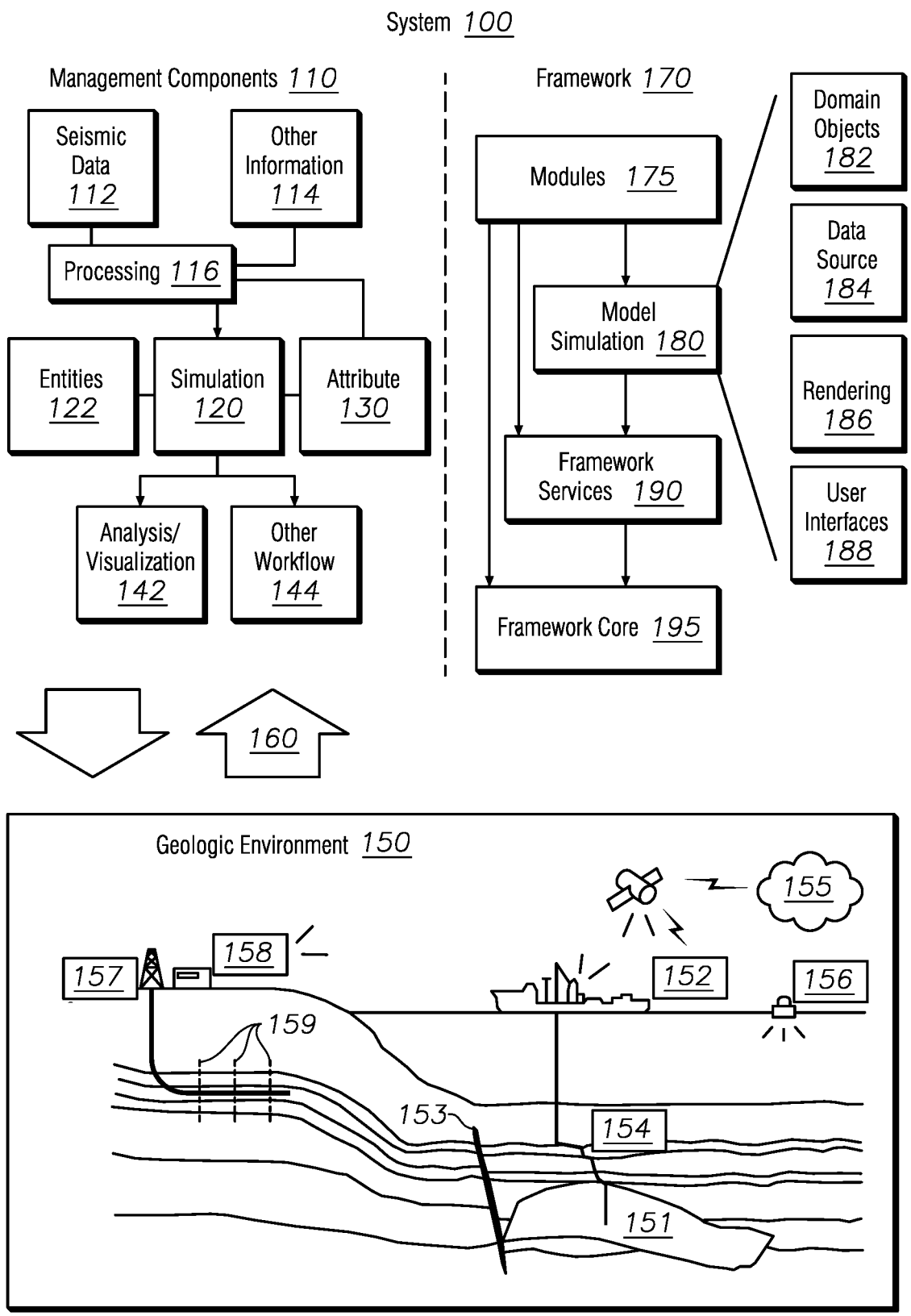
FIG. 1 illustrates an example system that includes various components for modeling a geologic environment and various equipment associated with the geologic environment, according to one or more embodiments.

FIG. 1 shows an example of a system 100 that includes several management components 110 to manage various aspects of a geologic environment 150 (for example, an environment that includes a sedimentary basin, a reservoir 151, and one or more fractures 153). For example, the management components 110 may allow for direct or indirect management of sensing, drilling, injecting, and extracting, with respect to the geologic environment 150. In turn, further information about the geologic environment 150 may become available as feedback 160 (for example, optionally as input to one or more of the management components 110).

In the example of FIG. 1, the management components 110 include a seismic data component 112, an additional information component 114 (for example, well/logging data), a processing component 116, a simulation component 120, an attribute component 130, an analysis/visualization component 142 and a workflow component 144. In operation, seismic data and other information provided per the components 112 and 114 may be input to the simulation component 120.

In an embodiment, the simulation component 120 may rely on entities 122. Entities 122 may include earth entities or geological objects such as wells, surfaces, and reservoirs. In the system 100, the entities 122 can include virtual representations of actual physical entities that are reconstructed for purposes of simulation. The entities 122 may include entities based on data acquired via sensing or observation (for example, the seismic data 112 and other information 114). An entity may be characterized by one or more properties (for example, a geometrical pillar grid entity of an earth model may be characterized by a porosity property). Such properties may represent one or more measurements (for example, acquired data) and calculations.

In an embodiment, the simulation component 120 may operate in conjunction with a software framework such as an object-based framework. In such a framework, entities may include entities based on pre-defined classes to facilitate modeling and simulation. A commercially available example of an object-based framework is the Microsoft® .NET framework, which provides a set of extensible object classes. In the Microsoft® .NET framework, an object class encapsulates a module of reusable code and associated data structures. Object classes can be used to instantiate object instances for use in by a program or script. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (for example, consider the processing component 116). As an example, the simulation component 120 may perform operations on input information based on one or more attributes specified by the attribute component 130. In an embodiment, the simulation component 120 may construct one or more models of the geologic environment 150, which may be relied on to simulate behavior of the geologic environment 150 (for example, responsive to one or more acts, whether natural or artificial). In the example of FIG. 1, the analysis/visualization component 142 may allow for interaction with a model or model-based results (for example, simulation results). As an example, output from the simulation component 120 may be input to one or more other workflows, as indicated by a workflow component 144.

FIG. 1 also shows an example of a framework 170 that includes a model simulation layer 180 along with a framework services layer 190, a framework core layer 195 and a modules layer 175. The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, and reservoirs, while property objects may be used to provide property values as well as data versions and display parameters. For example, an entity object may represent a well where a property object provides log information as well as version information and display information (for example to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (for example, stratification) that include a reservoir 151 and that may be intersected by a fault 153. As an example, the geologic environment 150 may be outfitted with any of a variety of sensors, detectors, and actuators. For example, equipment 152 may include communication circuitry to receive and to transmit information with respect to one or more networks 155. Such information may include information associated with downhole equipment 154, which may be equipment to acquire information, or to assist with resource recovery. Other equipment 156 may be located remote from a well site and include sensing, detecting, emitting or other circuitry. Such equipment may include storage and communication circuitry to store and to communicate data or instructions. As an example, one or more satellites may be provided for purposes of communications and data acquisition. For example, FIG. 1 shows a satellite in communication with the network 155 that may be configured for communications, noting that the satellite may additionally or alternatively include circuitry for imagery (for example, spatial, spectral, temporal, and radiometric).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (for example, hydraulic fractures) or a combination of natural and artificial fractures. As an example, a well may be drilled for a reservoir that is laterally extensive. In such an example, lateral variations in properties or stresses may exist where an assessment of such variations may assist with planning or operations to develop a laterally extensive reservoir (for example, via fracturing, injecting, and extracting). As an example, the equipment 157 or 158 may include components, a system, or systems for fracturing, seismic sensing, analysis of seismic data, and assessment of one or more fractures.

Figure 2:
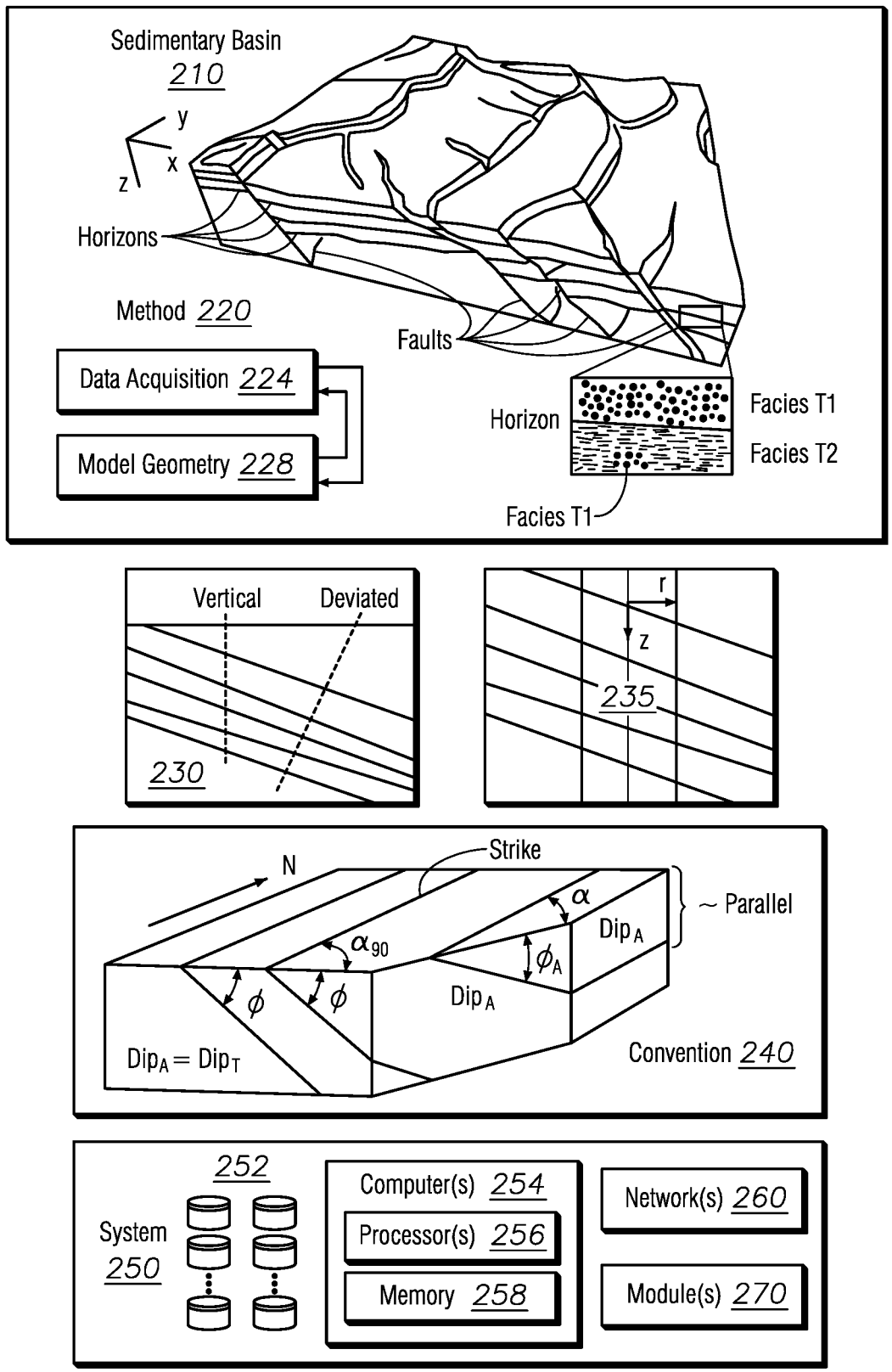
FIG. 2 illustrates an example of a sedimentary basin, an example of a method, an example of a formation, an example of a borehole, an example of a convention and an example of a system, according to one or more embodiments.

FIG. 2 shows an example of a sedimentary basin 210, an example of a method 220 for model building (for example, for a simulator), an example of a formation 230, an example of a borehole 235 in a formation, an example of a convention 240 and an example of a system 250. As an example, reservoir simulation or petroleum systems modeling may be applied to characterize various types of subsurface environments, including environments such as those of FIG. 1.

In FIG. 2, the sedimentary basin 210, which is a geologic environment, includes horizons, faults and facies formed over some period of geologic time. These features are distributed in two or three dimensions in space, for example, with respect to a Cartesian coordinate system (for example, x, y, and z) or other coordinate system (for example, cylindrical and spherical). As shown, the model building method 220 includes a data acquisition block 224 and a model geometry block 228. Some data may be involved in building an initial model and, thereafter, the model may optionally be updated in response to model output, changes in time, physical phenomena, or additional data. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (for example, due to seismic unconformities) assumed to follow geological events and data may include lateral facies variations (for example, due to lateral variation in sedimentation characteristics).

To proceed to modeling of geological processes, data may be provided, for example, data such as geochemical data (for example, temperature, kerogen type, or organic richness), timing data (for example, from paleontology, radiometric dating, magnetic reversals, or rock and fluid properties) and boundary condition data (for example, heat-flow history, surface temperature, or paleowater depth).

In basin and petroleum systems modeling quantities such as temperature, pressure and porosity distributions within the sediments may be modeled by solving partial differential equations (PDEs) using a finite element method (for example, or other numerical technique). Modeling may also model geometry with respect to time, for example, to account for changes stemming from geological events (for example, deposition of material, erosion of material, or shifting of material).

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230.

As to the convention 240 for dip, as shown, the three dimensional orientation of a plane can be defined by its dip and strike. Dip is the angle of slope of a plane from a horizontal plane (for example, an imaginary plane) measured in a vertical plane in a specific direction. Dip may be defined by magnitude (for example, also known as angle or amount) and azimuth (for example, also known as direction). As shown in the convention 240 of FIG. 2, various angles 1 indicate angle of slope downwards, for example, from an imaginary horizontal plane (for example, flat upper surface); whereas, dip refers to the direction towards which a dipping plane slopes (for example, which may be given with respect to degrees or compass directions). Another feature shown in the convention of FIG. 2 is strike, which is the orientation of the line created by the intersection of a dipping plane and a horizontal plane (for example, consider the flat upper surface as being an imaginary horizontal plane).

Some additional terms related to dip and strike may apply to an analysis, for example, depending on circumstances or orientation of collected data. One term is true dip (see, for example, $Dip_T$ in the convention 240 of FIG. 2). True dip is the dip of a plane measured directly perpendicular to strike (see, for example, line directed northwardly and labeled "strike" and angle $\alpha_{90}$) and also the maximum possible value of dip magnitude. Another term is "apparent dip" (see, for example, $Dip_A$ in the convention 240 of FIG. 2). Apparent dip may be the dip of a plane as measured in any other direction except in the direction of true dip (see, for example, $\Phi_A$ as $Dip_A$ for angle $\alpha$); however, it is possible that the apparent dip is equal to the true dip (see, for example, Φ as $Dip_A = Dip_T$ for angle $\alpha_{90}$ with respect to the strike). In other words, where the term apparent dip is used (for example, in a method, analysis, or algorithm), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, for example, the surface with Φ as $Dip_A = Dip_T$ for angle $\alpha_{90}$ with respect to the strike). As indicated, dip observed in a cross-section in any other direction is apparent dip (see, for example, surfaces labeled $Dip_A$). Further, as shown in the convention 240 of FIG. 2, apparent dip may be approximately 0 degrees (for example, parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (for example, which are referred to by some as relative dips). In order to determine true dip values for planes observed in such boreholes, as an example, a vector computation (for example, based on the borehole deviation) may be applied to one or more apparent dip values.

As mentioned, another term that finds use in sedimentological interpretations from borehole images is "relative dip" (for example, $Dip_R$). A value of true dip measured from borehole images in rocks deposited in very calm environments may be subtracted (for example, using vector-subtraction) from dips in a sand body. In such an example, the resulting dips are called relative dips and may find use in interpreting sand body orientation.

A convention such as the convention 240 may be used with respect to an analysis, an interpretation, an attribute (see, for example, various blocks of the system 100 of FIG. 1). As an example, various types of features may be described, in part, by dip (for example, sedimentary bedding, faults and fractures, cuestas, igneous dikes and sills, or metamorphic foliation).

Seismic interpretation may aim to identify or classify one or more subsurface boundaries based at least in part on one or more dip parameters (for example, angle or magnitude, or azimuth). As an example, various types of features (for example, sedimentary bedding, faults and fractures, cuestas, igneous dikes and sills, or metamorphic foliation) may be described at least in part by angle, or at least in part by azimuth.

As shown in FIG. 2, the system 250 includes one or more information storage devices 252, one or more computers 254, one or more networks 260 and one or more modules 270. As to the one or more computers 254, each computer may include one or more processors (for example, or processing cores) 256 and memory 258 for storing instructions (for example, modules), for example, executable by at least one of the one or more processors. As an example, a computer may include one or more network interfaces (for example, wired or wireless), one or more graphics cards, and a display interface (for example, wired or wireless). As an example, imagery such as surface imagery (for example, satellite, geological, or geophysical) may be stored, processed, or communicated. As an example, data may include SAR data, GPS data, and may be stored, for example, in one or more of the storage devices 252.

As an example, the one or more modules 270 may include instructions (for example, stored in memory) executable by one or more processors to instruct the system 250 to perform various actions. As an example, the system 250 may be configured such that the one or more modules 270 provide for establishing the framework 170 of FIG. 1 or a portion thereof. As an example, one or more methods, techniques, may be performed using one or more modules, which may be, for example, one or more of the one or more modules 270 of FIG. 2.

Figure 3:
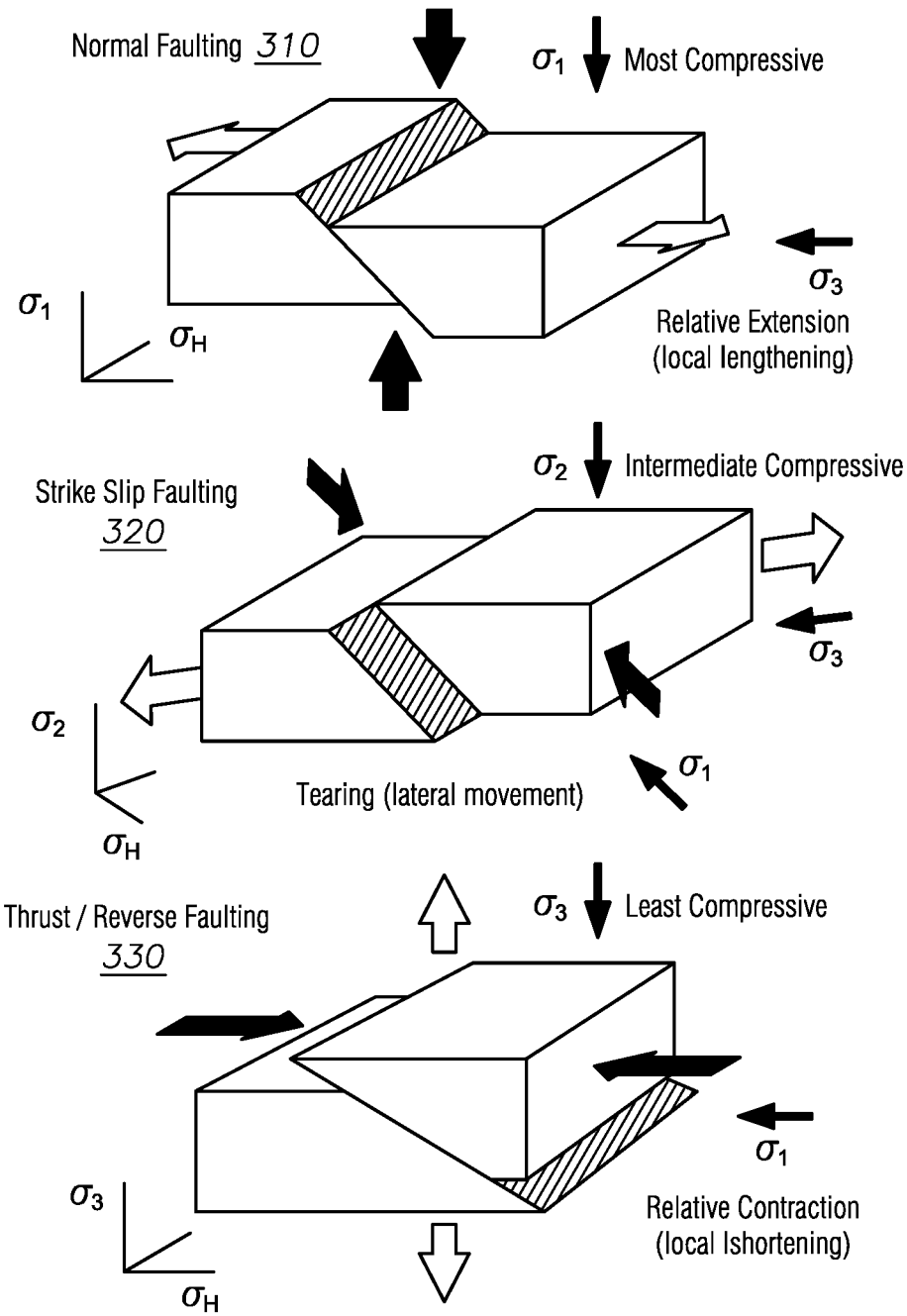
FIG. 3 illustrates an example of a tectonic regime for predicting shear failure of a rock formation, according to one or more embodiments.

FIG. 3 shows an example of a tectonic regime 300 and examples of normal faulting 310, strike slip faulting 320 and thrust or reverse faulting 330. Stress may be defined, for example, as force per unit area acting on a plane. In a solid body, for example, a stress state at a point in the solid body may be described by orientations and magnitudes of three stresses called principal stresses, which are oriented perpendicular to each other (for example, orthogonal to each other).

As shown in FIG. 3, $\alpha_1$, $\alpha_2$, and $\alpha_3$ are compressive or tensile principal stresses where, in magnitude, $\alpha_1 > \alpha_2 > \alpha_3$. As an example, about a point, the three principal stresses may be shown, or represented, as an ellipsoid where the magnitude of each component defines a maximum (for example, and a "minimum") along a respective one of the three orthogonal axes. The "minimum" is actually another maximum as compressive stress and shortening strain are considered positive in rock mechanics and structural geology because in the Earth the three principal stresses tend to be compressive (for example, except around underground voids such as caves, very near to the Earth's surface).

The tectonic regime 300 may be defined by considering one axis being vertical. For example, a normal fault regime corresponds to $\alpha_1$ being vertical, a strike slip fault regime corresponds to $\alpha_2$ being vertical and a thrust or reverse fault regime corresponds to $\alpha_3$ being vertical. The tectonic regime 300 may also define stresses $\alpha_H$, $\alpha_h$, and $\alpha_v$ are the maximum horizontal stress ($\alpha_H$), a minimum horizontal stress ($\alpha_h$) that may be orthogonal to the maximum horizontal stress, and a vertical stress ($\alpha_v$). The orientation of the maximum horizontal stress αH may be defined by an angle $\theta_H$, which may be local (for example, for a point or a feature), or far field.

An earthen formation can include layers of media where elasticity of the media (for example, in one or more layers) may be isotropic, anisotropic or isotropic in certain aspects and anisotropic in others. As an example, crustal rock may be anisotropic yet transversely isotropic "TI" (for example, locally polar anisotropic). Knowledge of isotropy, anisotropy, may assist with, for example, planning and execution of exploration and development operations of a reservoir or reservoirs within a formation. As an example, knowledge of isotropy, anisotropy, may assist with, for example, drilling of one or more boreholes in a formation.

As an example of parameters that can characterize various aspects of anisotropy of media (for example, seismic anisotropy), consider the Thomsen parameters υ, δ, and γ. The Thomsen parameter δ can describe depth mismatch between logs (for example, actual depth) and seismic depth. As to the Thomsen parameter υ, it can describe a difference between vertical and horizontal compressional waves (for example, P or P-wave or quasi compressional wave qP or qP-wave). As to the Thomsen parameter γ, it can describe a difference between horizontally polarized and vertically polarized shear waves (for example, horizontal shear wave SH or SH-wave and vertical shear wave SV or SV-wave or quasi vertical shear wave qSV or qSV-wave). Thus, the Thomsen parameters υ and γ may be estimated from wave data while estimation of the Thomsen parameter δ may involve access to additional information. As an example, the parameter may represent anisotropic phenomena of a medium of interest in geophysics, some phenomena of which may be non-negligible even where anisotropy may be considered to be weak.

In a Cartesian coordinate system, a stress tensor may be defined as being represented in part by elastic coefficients. Elastic properties of various types of rock may be approximated by so-called Vertical Transverse Isotropy (VTI or TI). As an example, sedimentary rocks layering can tend to be horizontal where a resulting symmetry axis may be vertical (for example, as for VTI). For such a system the elastic stiffness tensor can be described using five elastic coefficients: $C_{11}$, $C_{33}$, $C_{44}$, $C_{66}$ and $C_{13}$. For example, a Voigt compact representation may recast elastic coefficients to reduce an overall number of the coefficients. Such a representation may also recast indexes i, j, k and l in terms of $\alpha$ and $\beta$, for example, to arrive at an elastic modulus matrix $C\alpha\beta$ as a 6×6 matrix that includes terms $C_{11}$, $C_{13}$, $C_{33}$, $C_{44}$, and $C_{66}$. As an example, values for these five elastic coefficients may allow for determination of one or more of the Thomsen parameters $\upsilon$, $\delta$, and $\gamma$. As an example, the Thomsen parameter $\delta$ may be used to characterize near vertical P-wave speed variations, or angular dependence of SV-wave speed. Knowledge of the Thomsen parameter $\delta$ may be helpful for various reasons (for example, depth imaging/effects, media characterization, and media composition).

The Thomsen parameters, as well as other parameters, may be germane to venous field activities such as drilling, well completion, seismic migration velocity model construction, wellbore stability, hydraulic fracturing design and hydraulic fracture monitoring. As an example, as to shale gas reservoirs, knowledge of anisotropy parameters can assist with planning or execution, especially where one or more well configurations may vary over some range between vertical and horizontal.

As an example, anisotropy may be characterized using one or more parameters. While Thomsen parameters, elastic coefficients and compliances are mentioned, anisotropy may optionally be characterized using one or more other types of parameters or coefficients. As an example, one or more layers, media of a formation may be characterized with respect to one or more of isotropy, anisotropy, or VTI.

As an example, a method may include characterizing anisotropy with respect to one or more mechanical rock properties such as, for example, elastic, poroelastic, or poromechanics, strength (for example, under compression or tension).

As an example, a method may include modeling wellbore stability or instability. For example, a system may include modules stored in memory (for example, a non-transitory memory device) where the modules include instructions executable by a processor to model wellbore instability as may relate to, for example, drilling in one or more anisotropic formations. Such a model may be referred to, as an example, as a Modified Plane-of-Weakness (MPoW) model. For example, such a model may consider Jaeger's Plane-of-Weakness (PoW) failure criterion (for example, to identify onset of rock sliding along a weak plane) and effect of active shearing (for example, to determine whether the onset sliding at a borehole wall will develop and cause borehole instability). As to the latter, a model may provide for modeling structural behavior of laminated/fractured formation intersected by a borehole.

As an example, a method can include implementing a MPoW model. For example, in various trials, a method implemented an example of a MPoW model to generate results. Some examples of results are presented here.

As an example, a method can include an algorithm that includes near borehole stress modeling (for example, to map the stress distribution induced by drilling) and target mud weight (for example, to prevent failure) inversion (for example, to solve for one or more thresholds not to be exceeded to ensure a physical reasonable solution in formation rock subject to geo-stress conditions). As an example, a method may be implemented as part of one or more workflows. For example, a workflow may include near borehole stress modeling. Such a method may include determining one or more target mud weights. As an example, a method may include drilling, delivery mud, for example, based at least in part on near borehole stress modeling.

Figure 4:
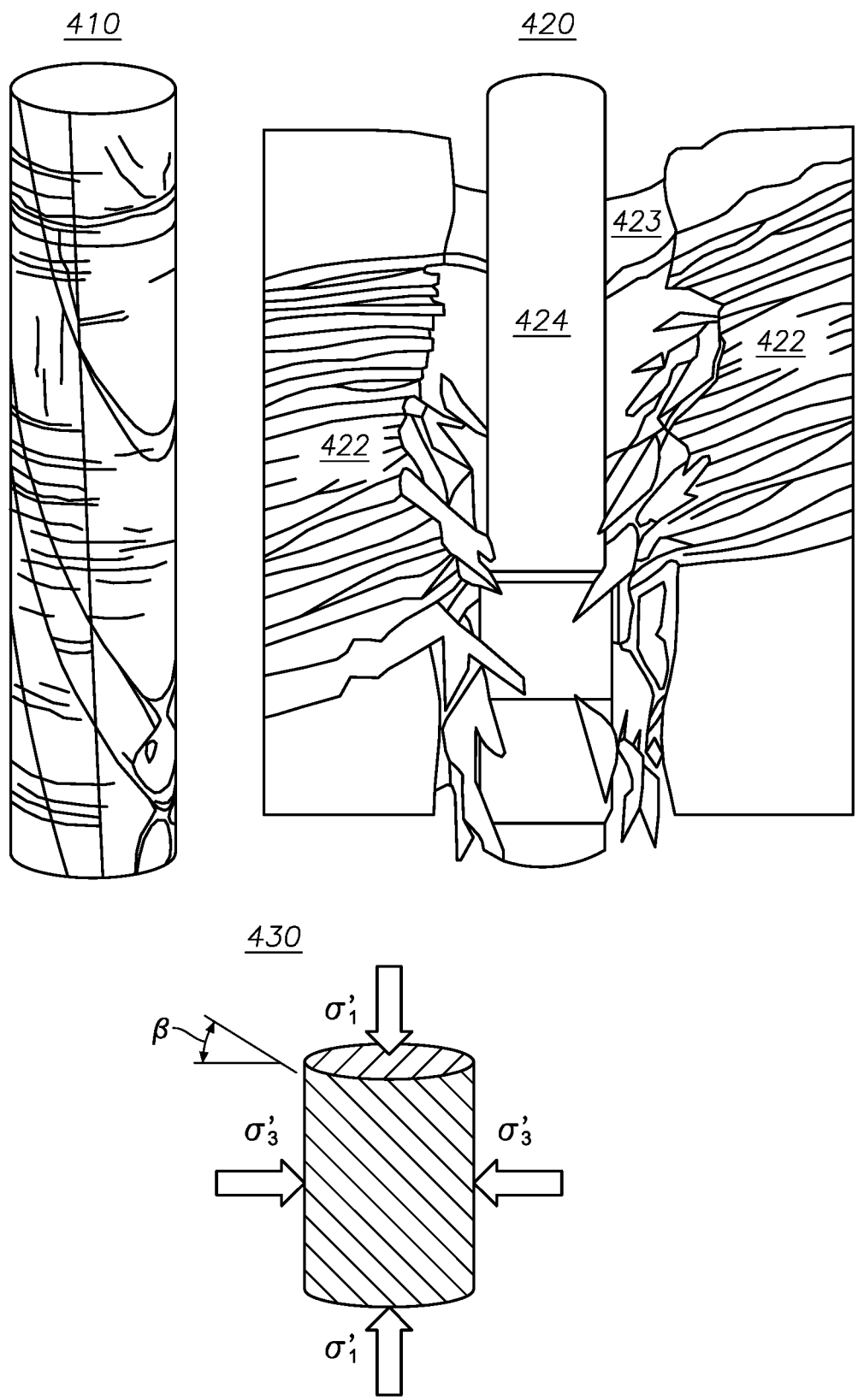
FIG. 4 illustrates examples of formations and a model for predicting shear failure of a rock formation, according to one or more embodiments.
Figure 5A:
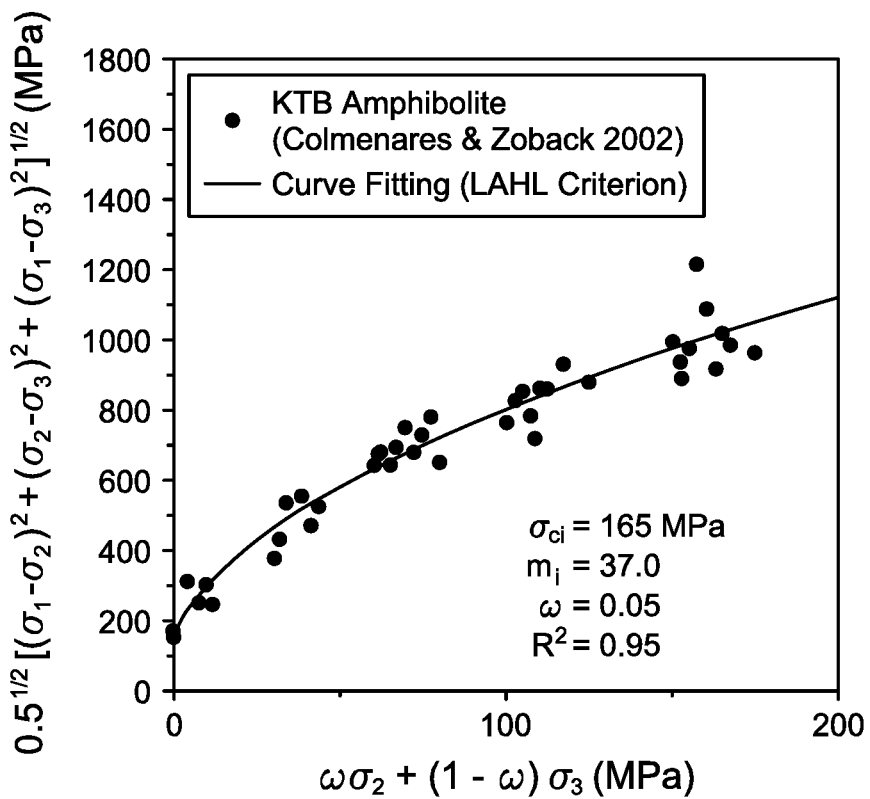
FIGS. 5A-5B illustrate application of a modified Hoek-Brown failure criterion for predicting shear failure of a rock formation, according to one or more embodiments.
Figure 5B:
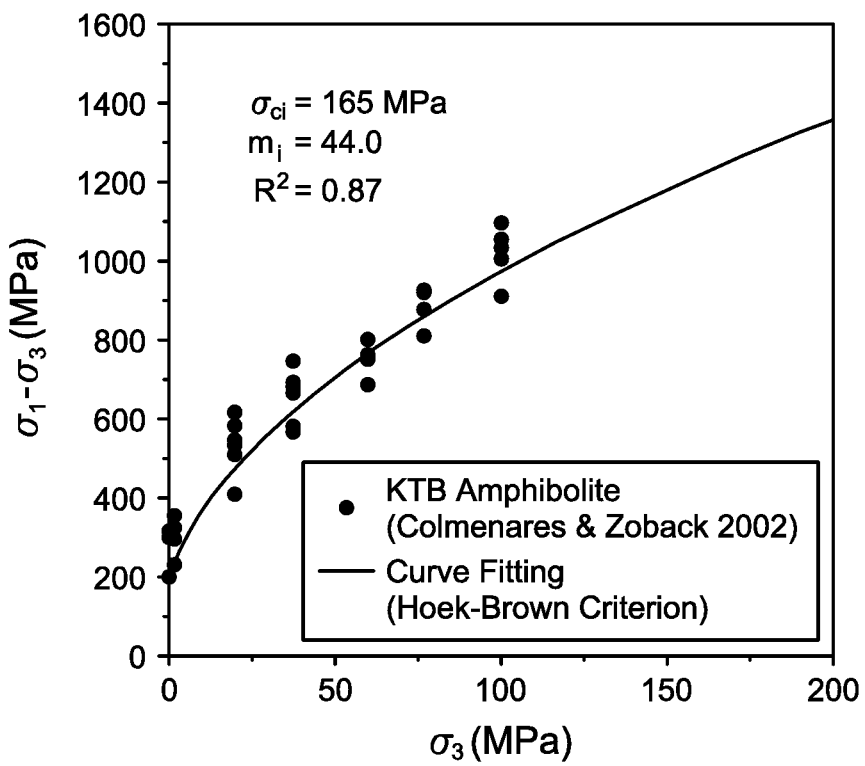
Figure 6A:
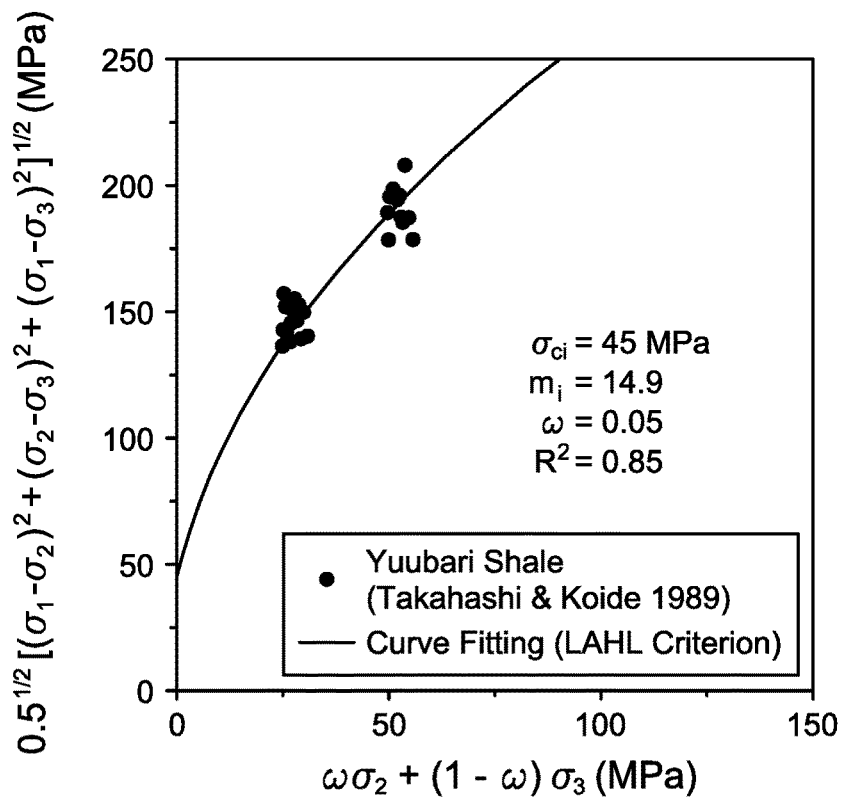
FIGS. 6A-6B illustrate application of a modified Hoek-Brown failure criterion for predicting shear failure of a rock formation, according to one or more embodiments.
Figure 6B:
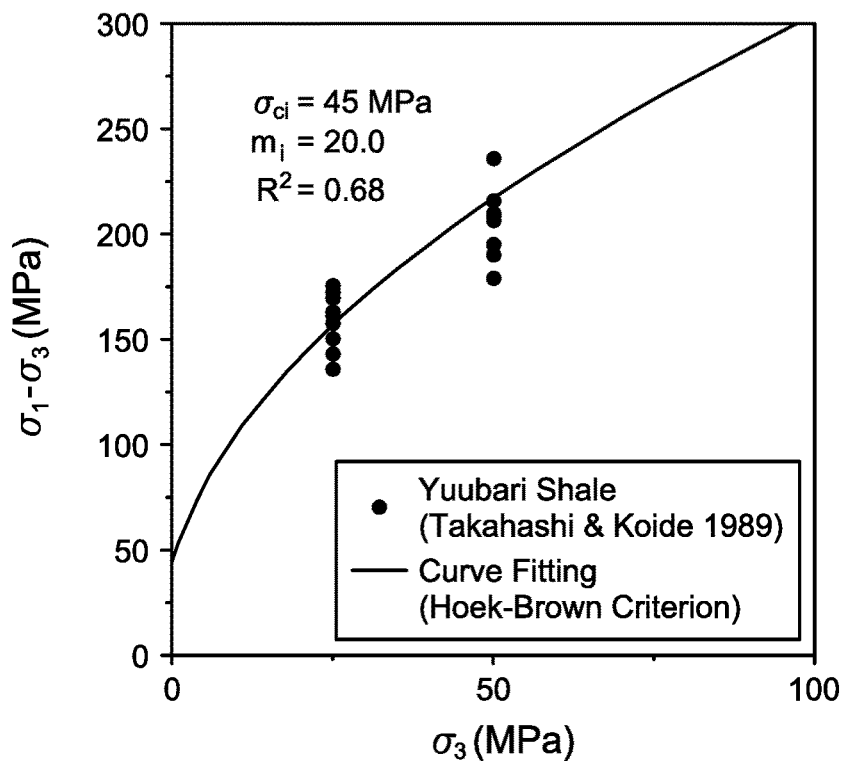
Figure 7A:
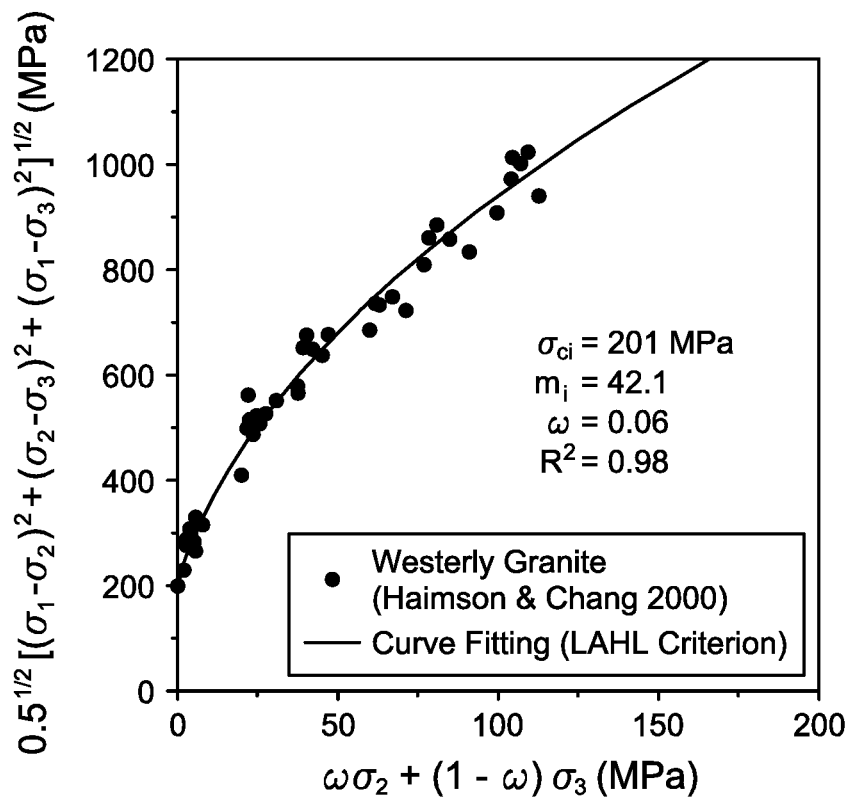
FIGS. 7A-7B illustrate application of a modified Hoek-Brown failure criterion for predicting shear failure of a rock formation, according to one or more embodiments.
Figure 7B:
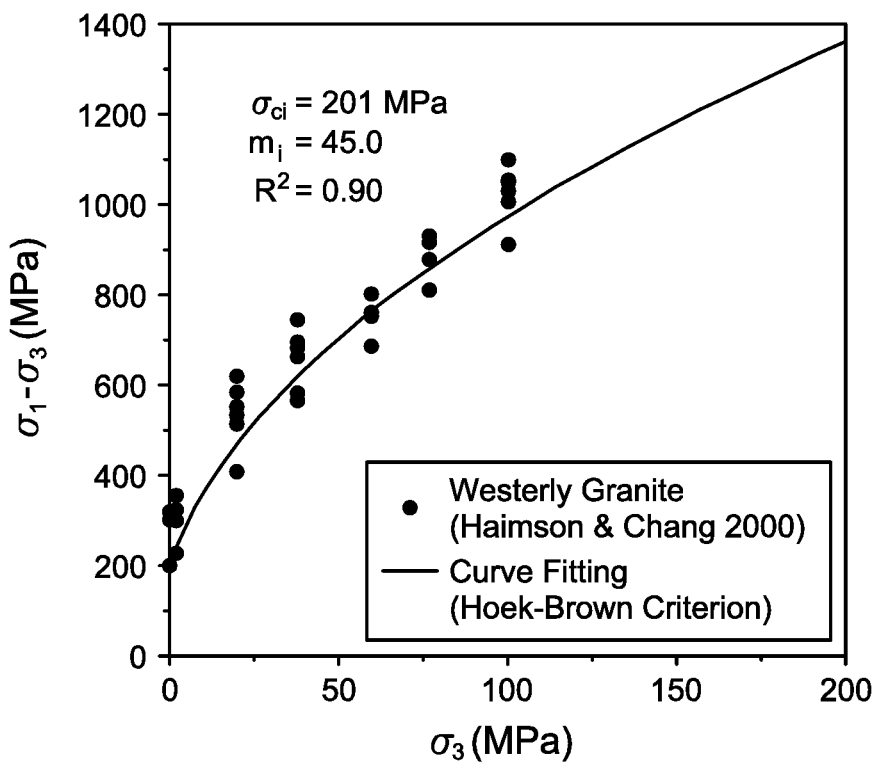
Figure 8A:
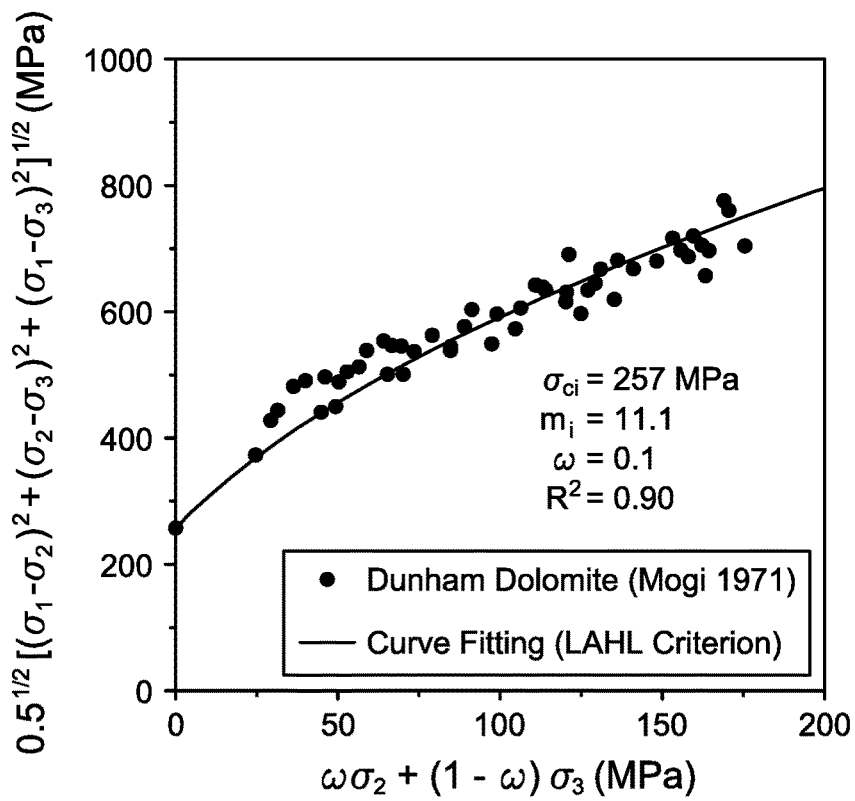
FIGS. 8A-8B illustrate application of a modified Hoek-Brown failure criterion for predicting shear failure of a rock formation, according to one or more embodiments.
Figure 8B:
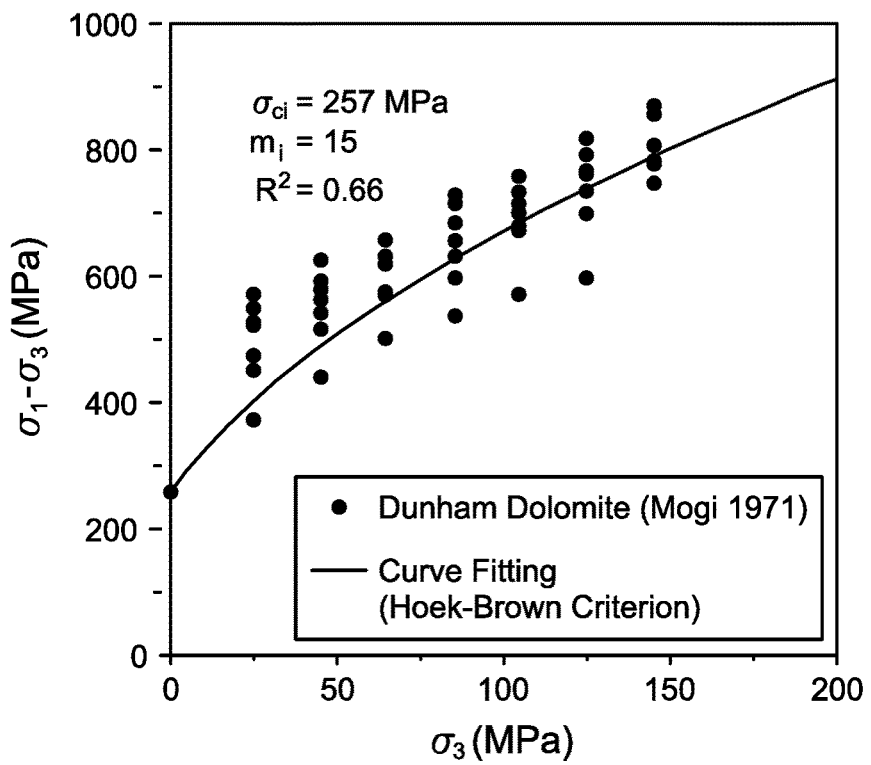
Figure 9A:
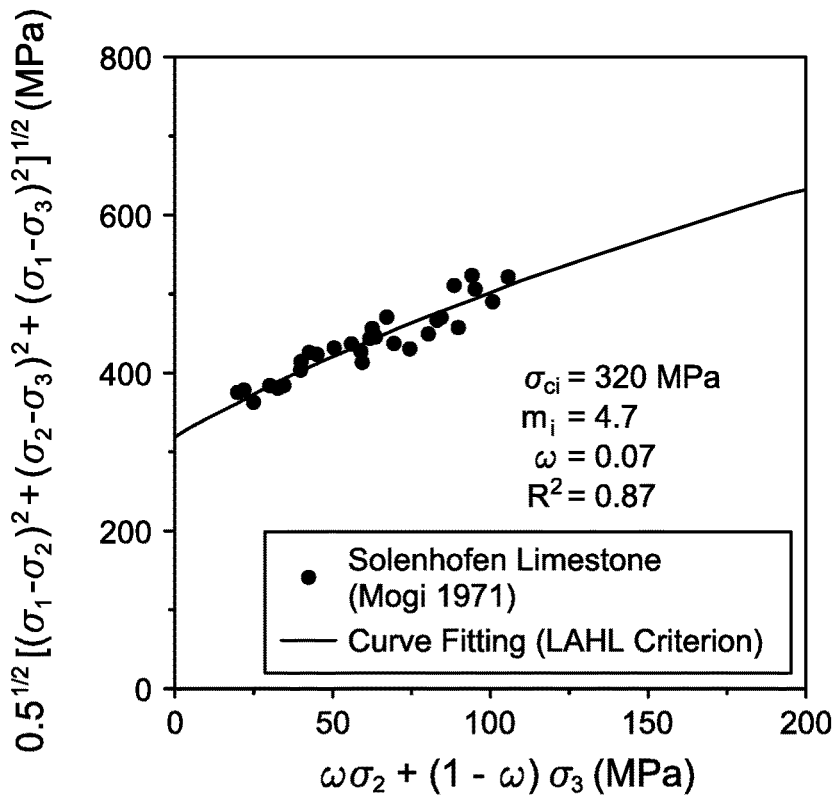
FIGS. 9A-9B illustrate application of a modified Hoek-Brown failure criterion for predicting shear failure of a rock formation, according to one or more embodiments.
Figure 9B:
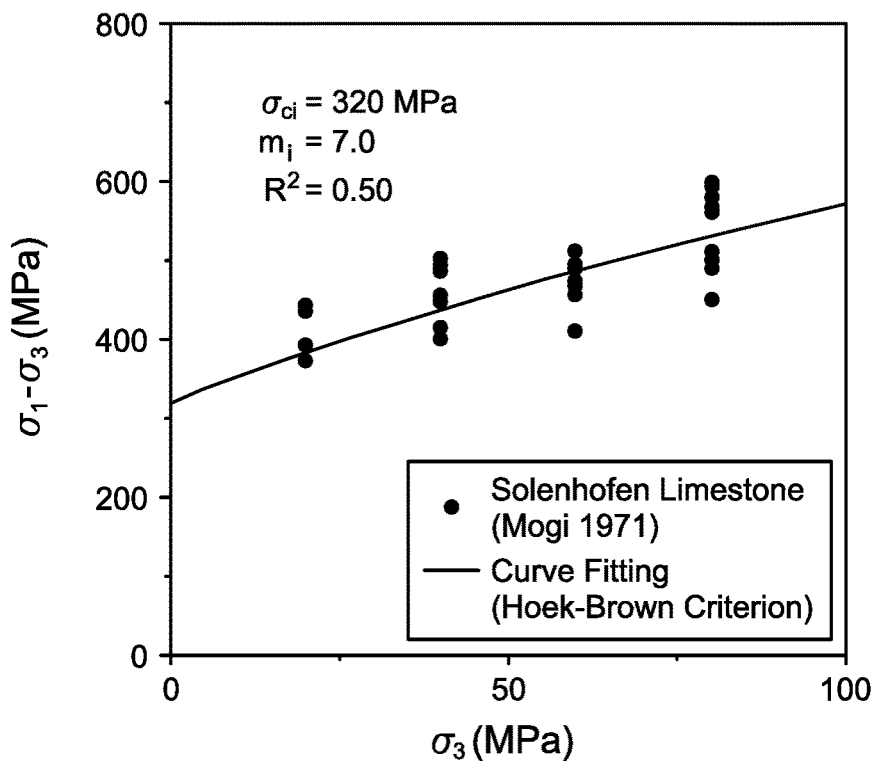
Figure 10A:
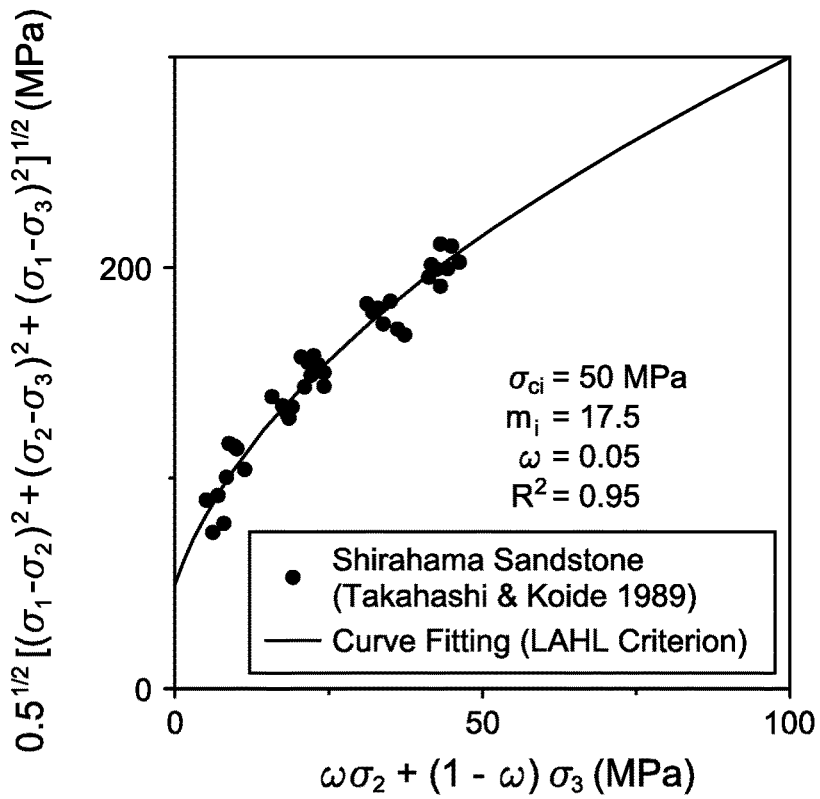
FIGS. 10A-10B illustrate application of a modified Hoek-Brown failure criterion for predicting shear failure of a rock formation, according to one or more embodiments.
Figure 10B:
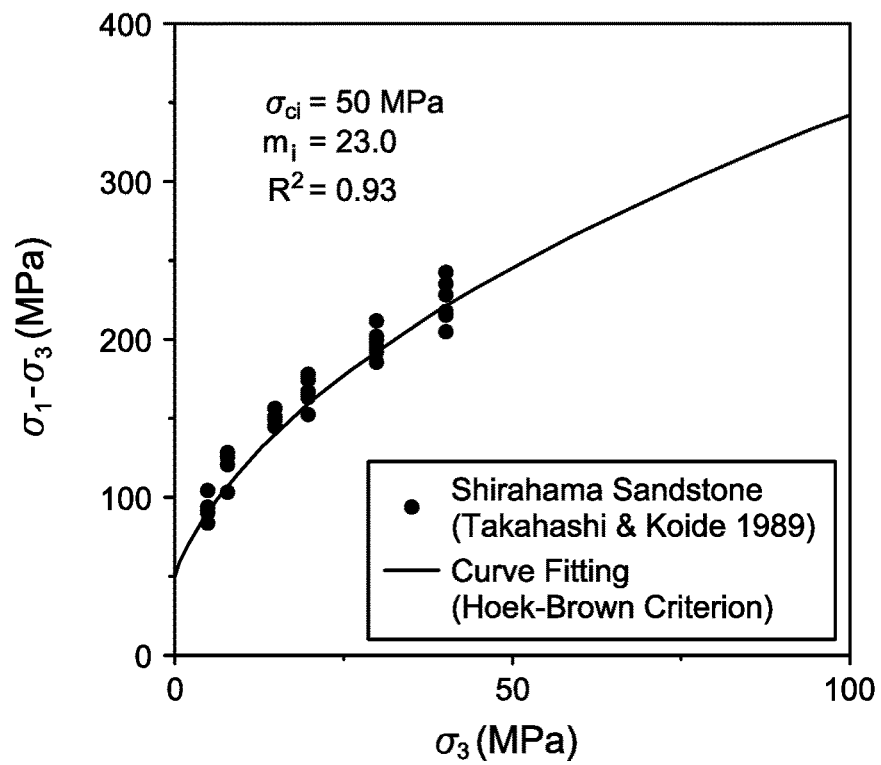

FIG. 4 shows an example of core data 410, an approximate graphic of laminations about a bore that may fail 420, and an example graphic associated with the aforementioned Jaeger Potty approach 430. The graphic 430 shows an angle for layers as well as directions of stresses.

As an example, a tool may be positioned in a borehole, for example, to acquire information. As an example, a borehole tool may be configured to acquire electrical borehole images, for example, consider the fullbore Formation Micro Imager (FMI) tool, which can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, information may be acquired about a formation using seismology, for example, to acquire seismic data. As mentioned, seismic data may be processed using a framework which may include one or more interfaces for receipt of seismic data and imagery data. Such a framework may include one or more modules with instructions executable to process received data. As an example, seismic data may optionally be analyzed to determine one or more parameters, which may include one or more parameters that characterize anisotropy.

In FIG. 4, the core data 410 may be or include data acquired using a tool positioned in a borehole. The core data 410 may be a cylindrical surface of data, for example, representative of a surface of a borehole. As an example, a tool may include circuitry to image a region at or beyond a surface of a borehole (for example, to a depth or depths from a surface of a bore hole into material). As an example, core data may include one or more types of data as acquired by a tool or tools positioned in a borehole.

Bores drilled through laminated rocks like shales and, in particular, deviated bores such as lateral bores (for example, horizontal wells), may be less stable than comparable bores drilled into non-laminated rocks. Such bores may exhibit borehole instability issues that can elevate drilling operation costs. Bores drilled through naturally fractured formations may also be more challenging from a borehole stability point of view than wells drilled through un-fractured formations. As an example, a bores drilled into an artificially fractured formation may present challenges from a borehole stability point of view when compared to a bore drilled into a formation that has not been artificially fractured (for example, prior to hydraulic fracturing, eta). While shale is mentioned as an example of rock, other types of rock may be analyzed with respect to stability or instability.

Referring to the graphic 420, a layer 422 of laminated material (for example, laminations) is shown where material from the layer 422 has entered a bore 423, for example, in an annular region about equipment 424 (for example, drilling or other equipment). In the example graphic 420, which is shown in a cutaway view, material from the left side and material from the right side have entered the bore 423. As an example, where the angle of the layer 422 is steeper with respect to a longitudinal axis of the bore 423, entry of material may differ. As an example, entry of material may depend on various factors (for example, geometry of a bore, operation of equipment in a bore, forces in material adjacent a bore or far field forces).

As an example, an angle may be an "attack angle", for example, defined by an angle between a bore axis and one or more bedding planes. As an example, a method may include analyzing data to estimate an attack angle that may be greater than an angle that may predictably present bore instability. As an example, a method may include analyzing data to determine an attack angle for a bore to be drilled into a particular formation where the determined attack angle exceeds an attack angle of about 20 degrees, for example, to avoid weak-plane related bore instability issues in the particular formation.

As illustrated by the graphic 420, material may not be isotropic or homogeneous at or proximate to a bore. As an example, material may be anisotropic or inhomogeneous (for example, heterogeneous). As an example, a model may account for laminated or fractured rocks, for example, accounting for presence of fractures or bed interfaces, for example, as pre-existing planes of weakness.

The aforementioned Jaeger PoW model considers the Mohr-Coulomb criterion to describe shear sliding failure of weakness planes and also for intact rock matrix yielding (see, for example, Jaeger, J. C., Shear failure of anisotropic rocks. Geol. Mag., 1960, 97, 65, which is incorporated by reference here). Such an approach may, at times, provide for approximating, as a prediction, onset of failure (for example, yielding or sliding) at one position around a bore; however, it does not provide for prediction as to whether yielding/sliding may develop and, for example, cause borehole failure or not.

However, shear sliding failure along fractures or weak planes intersecting a wellbore may be a wellbore instability mechanism that can have a considerable impact on one or more operations. Such failure phenomena may not be characterized through use of borehole stability criteria for homogeneous isotropic rocks alone (for example, Mohr-Coulomb, Hoek-Brown, Mogi-Coulomb et al.) as one or more borehole failure mechanisms in laminated or fractured formations may differ from those associated with strictly isotropic or homogenous formations.

Hoek-Brown Failure Criterion

The empirical Hoek-Brown failure criterion for intact rocks was presented by Hoek and Brown in 1980 as follows:

$$\sigma_1 = \sigma_3 + \sigma_{ci}\left(m_i \frac{\sigma_3}{\sigma_{ci}} + 1\right)^{0.5} \tag{1}$$

where $\sigma_1$ and $\sigma_3$ are the maximum and minimal principal stresses at failure, respectively, $\sigma_{ci}$ is the uniaxial compressive strength of the intact rock, $m_i$ is a constant depending on the properties of the intact rock, such as the frictional characteristics of the minerals.

The more generalized Hoek-Brown failure criterion for fractured/jointed rocks was provided by Hoek and Brown in 1997 as follows:

$$\sigma_1 = \sigma_3 + \sigma_{ci}\left(m_b \frac{\sigma_3}{\sigma_{ci}} + s\right)^a \tag{2}$$

where s and a depend on fracture geometry and surface conditions, $m_b$ depends on both fracture and intact rock matrix properties.

Hoek and Brown (1997) introduced the concept of Geological Strength Index (GSI) to quantify the effects of fractures/joints on rock strength and provided the empirical correlation between the parameters s, a, and GSI, as shown in Table 1.

TABLE 1

Determination of s, a, and $m_b$ from GSI and $m_i$ (from Hoek and Brown 1997):

| Parameters | GSI ≤ 25 | GSI > 25 | Intact Rock (GSI = 100) | Range | Depends on |
|---|---|---|---|---|---|
| s | 0 | $e^{(GSI-100)/9}$ | 1 | [0, 1] | Fractures' properties |
| a | 0.65 − GSI/200 | 0.5 | 0.5 | [0.5, 0.65] | (geometry, surface conditions) |
| $m_b$ | $m_i e^{(GSI-100)/28}$ | | $m_i$ | (0, $m_i$] | Fractures and intact rock properties (frictional characteristics of minerals) |

Modified Hoek-Brown Failure Criterion

As can be seen from equations (1) and (2), the Hoek-Brown failure criterion does not consider the intermediate principal stress, $\alpha_2$, which has been shown experimentally to have effects of rock strength enhancement (Mogi 1971; Takahashi & Koide 1989). Accordingly, some embodiments include a modified Hoek-Brown failure criterion to consider the intermediate principal stress, $\alpha_2$. Meanwhile, the different degrees of the effects of the intermediate and the minimal principal stresses are characterized by a weight term, co, in the modified Hoek-Brown failure criterion which is expressed as follows:

$$\sqrt{\frac{1}{2}[(\sigma_1 - \sigma_2)^2 + (\sigma_2 - \sigma_3)^2 + (\sigma_1 - \sigma_3)^2]} = \sigma_{ci}\left(\frac{m_b}{\sigma_{ci}}(\omega\sigma_2 + (1-\omega)\sigma_3) + s\right)^a \tag{3}$$

where ω (0≤ω≤1) is the weight term that quantifies the different degrees of the effects of the intermediate principal stress, $\alpha_2$, and the minimal principal stress, $\sigma_3$, on the shear failure of rocks.

The left side of equation (3) is the differences of normal stresses. The term of $\omega\sigma_2+(1-\omega) \sigma_3$ on the right side of equation (3) can be considered as the average confining stress during a poly-axial test. The weight term, ω, is introduced in equation (3) to quantify the different degrees of the influences of $\sigma_2$ and $\sigma_3$ to rock shear failure. Basically, equation (3) predicts that shear failure occurs when the term of the normal stress differences reaches some critical value that is dependent on the unconfined compressive strength ($\sigma_{ci}$) of the rock, rock matrix and fractures' properties ($m_b$, s, a), and the average confining stress, $\omega\sigma_2+(1-\omega)\sigma_3$.

counterpart in Hoek-Brown failure criterion (referred to in the table as HB). Marino and Hoek (2000) performed best-fit using Hoek-Brown failure criterion on triaxial test (that is, $\sigma_2=\sigma_3$) data from same type of rocks, the corresponding values of $m_i$ are duplicated in the last column of Table 2. As can be seen, they are quite close to the values given by modified Hoek-Brown failure criterion on true triaxial test data.

TABLE 2

Summary of the results between the modified Hoek-Brown and the Hoek-Brown failure criteria with the poly-axial test results:

| Rock Type | UCS (MPa) | ω for MHB | $R^2$ for best-fit of HB | $R^2$ for best-fit of MHB | $m_i$ for best-fit of HB | $m_i$ for best-fit of MHB | Empirical values of $m_i$ from tri-axial tests |
|---|---|---|---|---|---|---|---|
| KTB-Amphibolite | 165 | 0.05 | 0.87 | 0.95 | 44 | 37 | 26 ± 6 |
| Yuubari Shale | 45 | 0.05 | 0.68 | 0.85 | 20 | 14.9 | 7 ± 4 |
| Westerly Granite | 201 | 0.06 | 0.90 | 0.98 | 45 | 42.1 | 32 ± 3 |
| Dunham Dolomite | 257 | 0.1 | 0.66 | 0.90 | 20 | 11.1 | 7 ± 4 |
| Solenhofen Limestone | 320 | 0.07 | 0.50 | 0.87 | 7 | 4.7 | 12 ± 3 |
| Shirahama Sandstone | 50 | 0.05 | 0.93 | 0.95 | 23 | 17.5 | 17 ± 4 |

It can be proven that equation (3) reduces to the original Hoek-Brown failure criterion for tri-axial tests ($\sigma_1>\sigma_2=\sigma_3$), and that equation (3) is able to capture the results of poly-axial tests ($\sigma_1>\sigma_2>\sigma_3$). The former can be easily shown by setting $\sigma_2=\sigma_3$, as equation (3) reduces to equation (2). The latter is illustrated by the following comparisons among various poly-axial tests, the Hoek-Brown failure criterion, and the modified Hoek-Brown failure criterion.

Validation of the Modified Hoek-Brown Failure Criterion

In this section, the original Hoek-Brown failure criterion and the modified Hoek-Brown failure criterion are used to analyze some published poly-axial tests results. FIGS. 5A-11B illustrate the applications of the modified Hoek-Brown failure criterion (referred to as the LAHL Criterion in these figures) and the Hoek-Brown failure criterion to match experimental results. It can be seen from these figures that the modified Hoek-Brown failure criterion is able to capture the shear failure of various rocks during poly-axial tests. The Hoek-Brown failure criterion is able to capture the poly-axial tests results to some degree. Detailed comparisons between the two shear failure criteria are presented in Table 2, for example.

Figure 11:
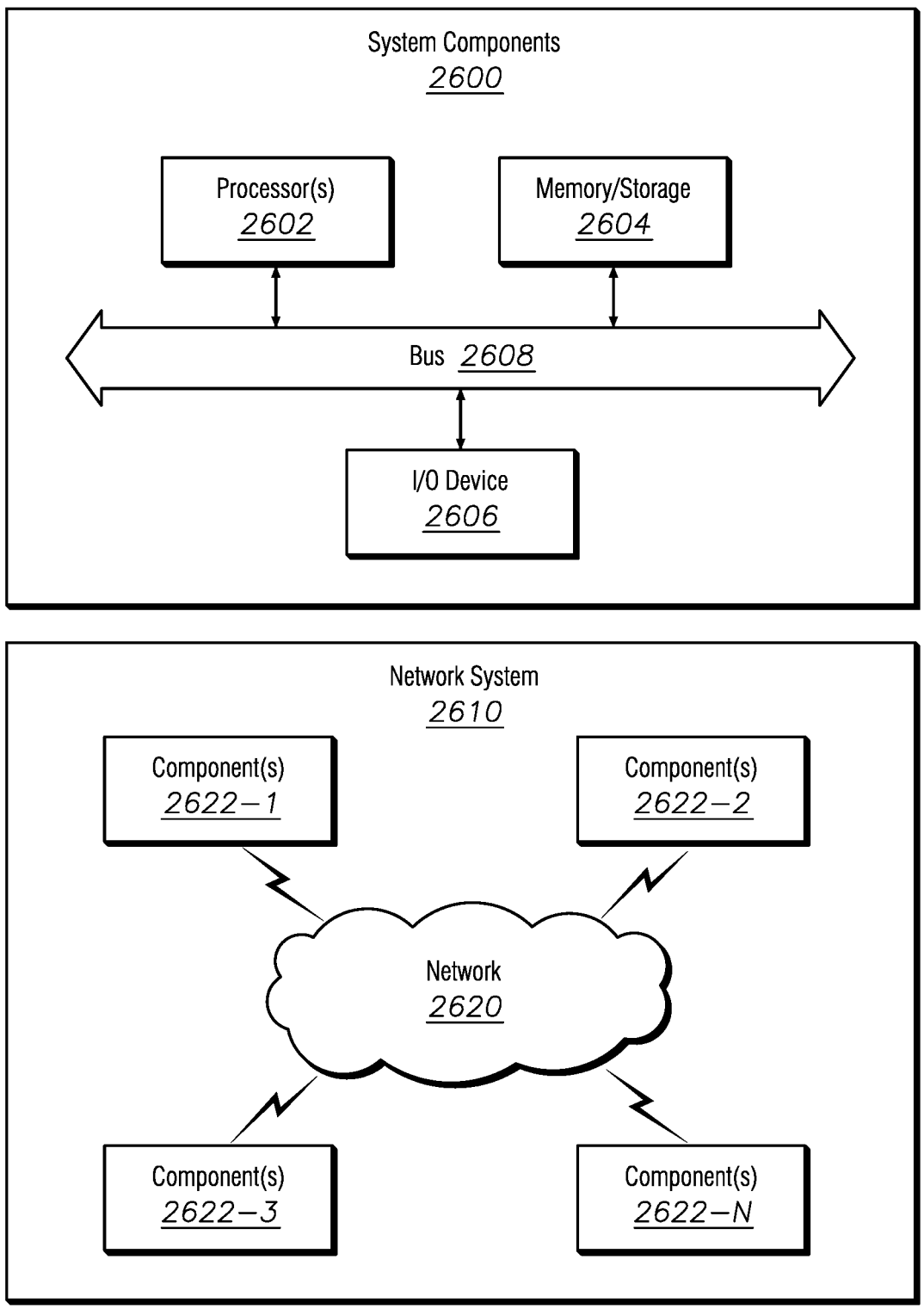
FIG. 11 illustrates example components of a system and a networked system for predicting shear failure of a rock formation, according to one or more embodiments.

As can be seen from Table 2, to match the poly-axial test results, the coefficient of determination, $R^2$, is in the range of 0.86 and 0.98 for the modified Hoek-Brown failure criterion and in the range of 0.68 and 0.93 for the original Hoek-Brown criterion. The significant higher values of the coefficient of determination for the modified Hoek-Brown failure criterion indicate that the modified Hoek-Brown failure criterion has better matches with the experimental data. Furthermore, the weight term, ω, is relatively small in the range of 0.05 and 0.1, which indicates that the intermediate principal stress, $\sigma_2$, has less contributions to rock shear failure in such poly-axial tests, compared to the minimal principal stress, $\sigma_1$. Table 2 also shows that, on the same set of triaxial test data, the value of the parameter, $m_i$, in modified Hoek-Brown failure criterion (referred to in the table as MHB) that gives best-fit is quite different from its FIG. 11 shows components of an example of a computing system 2600 and an example of a networked system 2610. The system 2600 includes one or more processors 2602, memory or storage components 2604, one or more input or output devices 2606 and a bus 2608. In an embodiment, instructions may be stored in one or more computer-readable media (for example, memory/storage components 2604). Such instructions may be read by one or more processors (for example, the processor(s) 2602) via a communication bus (for example, the bus 2608), which may be wired or wireless. The one or more processors may execute such instructions to implement (wholly or in part) one or more attributes (for example, as part of a method). A user may view output from and interact with a process via an I/O device (for example, the device 2606). In an embodiment, a computer-readable medium may be a storage component such as a physical memory storage device, for example, a chip, a chip on a package, a memory card (for example, a computer-readable storage medium).

In an embodiment, components may be distributed, such as in the network system 2610. The network system 2610 includes components 2622-1, 2622-2, 2622-3, . . . , 2622-N. For example, the components 2622-1 may include the processor(s) 2602 while the component(s) 2622-3 may include memory accessible by the processor(s) 2602. Further, the component(s) 2602-2 may include an I/O device for display and optionally interaction with a method. The network may be or include the Internet, an intranet, a cellular network, or a satellite network.

As an example, a device may be a mobile device that includes one or more network interfaces for communication of information. For example, a mobile device may include a wireless network interface (for example, operable via IEEE 802.11 standards, ETSI standards, Bluetooth™, or satellite). As an example, a mobile device may include components such as a main processor, memory, a display, display graphics circuitry (for example, optionally including touch and gesture circuitry), a SIM slot, audio/video circuitry, motion processing circuitry (for example, accelerometer, gyroscope), wireless LAN circuitry, smart card circuitry, transmitter circuitry, GPS circuitry, and a battery. As an example, a mobile device may be configured as a cell phone or a tablet. As an example, a method may be implemented (for example, wholly or in part) using a mobile device. As an example, a system may include one or more mobile devices.

As an example, a system may be a distributed environment, for example, a so-called "cloud" environment where various devices, components, interact for purposes of data storage, communications, and computing. As an example, a device or a system may include one or more components for communication of information via one or more of the Internet (for example, where communication occurs via one or more Internet protocols), a cellular network, or a satellite network. As an example, a method may be implemented in a distributed environment (for example, wholly or in part as a cloud-based service).

As an example, information may be input from a display (for example, consider a touchscreen), output to a display or both. As an example, information may be output to a projector, a laser device, or a printer, such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (for example, horizons), geobodies constructed in 3D. As an example, holes, fractures, may be constructed in 3D (for example, as positive structures or as negative structures).

The Specification, which includes the Summary, Brief Description of the Drawings and the Detailed Description, and the appended Claims refer to particular features (including process or method steps) of the disclosure. Those of skill in the art understand that the disclosure includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this disclosure belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Conditional language, such as, among others, "can," "could," "might," or "may," unless specifically stated otherwise, or otherwise understood within the context as used, is generally intended to convey that certain implementations could include, while other implementations do not include, certain features, elements, or operations. Thus, such conditional language generally is not intended to imply that features, elements, or operations are in any way required for one or more implementations or that one or more implementations necessarily include logic for deciding, with or without user input or prompting, whether these features, elements, or operations are included or are to be performed in any particular implementation.

The systems and methods described here, therefore, are well adapted to carry out the objects and attain the ends and advantages mentioned, as well as others inherent there. While embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed here and the scope of the appended claims.

The invention claimed is:

1. A method for determining shear failure of a rock formation, the method comprising:
drilling a bore into the rock formation to form a borehole;
positioning a tool within the borehole and acquiring data with the tool;
developing a plurality of parameters related to physical properties of the rock formation from the data;
applying the plurality of parameters to a predetermined failure criterion;
predicting shear failure of the rock formation based on the failure criterion; and
planning an exploration operation of a reservoir within the rock formation by fracture monitoring to determine the predicted shear failure of the rock formation;
wherein the failure criterion comprises:

$$\sqrt{\frac{1}{2}[(\sigma_1 - \sigma_2)^2 + (\sigma_2 - \sigma_3)^2 + (\sigma_1 - \sigma_3)^2]} = \sigma_{ci}\left(\frac{m_b}{\sigma_{ci}}(\omega\sigma_2 + (1-\omega)\sigma_3) + s\right)^a$$

where $\sigma_l$ is the maximum principal stress at failure; s and a depend on fracture geometry and surface conditions; $m_b$ depends on the fracture and intact rock matrix properties; $\omega$ ($0 \leq \omega \leq 1$) is the weight term that quantifies the different degrees of the effects of the intermediate principal stress, $\sigma_2$, and the minimal principal stress, $\sigma_3$, on the shear failure of the rock formation; $\sigma_{ci}$ is the unconfined compressive strength; and the term of $\omega\sigma_2 + (1-\omega)\sigma_3$ on the right side of equation is the average confining stress during a poly-axial test.

2. The method according to claim 1, wherein the failure criterion is a modified Hoek-Brown failure criterion.

3. The method according to claim 1, wherein the failure criterion comprises an intermediate principal stress.

4. The method according to claim 1, wherein the failure criterion comprises a difference between normal stresses and an average confining stress.

5. The method according to claim 1, wherein the failure criterion is configured to determine that shear failure of the rock formation occurs when the term of the normal stress differences reaches a predetermined value that is dependent on the unconfined compressive strength ($\sigma_{ci}$), rock matrix and fracture properties ($m_b$, s, a), and the average confining stress, $\omega\sigma_2 + (1-\omega)\sigma_3$.

6. A system for determining shear failure of a rock formation, the system comprising:

a borehole obtained by drilling a bore into the rock formation;

a tool positioned within the borehole operable to acquire data;

a processing unit; and a memory unit in communication with the processing unit, the memory unit comprising program instructions that when executed by the processing unit cause the operations of:

receiving a plurality of parameters related to physical properties of the rock formation, where the plurality of parameters were developed from the data;

applying the plurality of parameters to a predetermined failure criterion; and performing fracture monitoring to predict shear failure of the rock formation based on the failure criterion, wherein the failure criterion comprises:

$$\sqrt{\frac{1}{2}[(\sigma_1-\sigma_2)^2+(\sigma_2-\sigma_3)^2+(\sigma_1-\sigma_3)^2]} = \sigma_{ci}\left(\frac{m_b}{\sigma_{ci}}(\omega\sigma_2+(1-\omega)\sigma_3)+s\right)^a$$

where $\sigma_1$ is the maximum principal stress at failure; s and a depend on fracture geometry and surface conditions; $m_b$ depends on the fracture and intact rock matrix properties; $\omega(0 \leq \omega \leq 1)$ is the weight term that quantifies the different degrees of the effects of the intermediate principal stress, $\sigma_2$, and the minimal principal stress, $\sigma_3$, on the shear failure of the rock formation; $\sigma_{ci}$ is the unconfined compressive strength; and the term of $\omega\sigma_2+(1-\omega)\sigma_3$ on the right side of equation is the average confining stress during a poly-axial test.

7. The system according to claim 6, wherein the failure criterion is a modified Hoek-Brown failure criterion.

8. The system according to claim 6, wherein the failure criterion comprises an intermediate principal stress.

9. The system according to claim 6, wherein the failure criterion comprises a difference between normal stresses and an average confining stress.

10. The system according to claim 6, wherein the failure criterion is configured to determine that shear failure occurs when the term of the normal stress differences reaches a predetermined value that is dependent on the unconfined compressive strength ($\sigma_{ci}$) of the rock formation, rock matrix and fracture properties ($m_b$, s, a), and the average confining stress, $\omega\sigma_2+(1-\omega)\sigma_3$.

11. A non-transitory computer readable medium comprising a computer program, that when executed by the processing unit of claim 7, is configured to:

receive a plurality of parameters related to physical properties of the rock formation, where the plurality of parameters were developed from the data acquired by the tool positioned within the borehole;

apply the plurality of parameters to a predetermined failure criterion; and perform fracture monitoring to predict shear failure of the rock formation based on the failure criterion, wherein the failure criterion is as follows:

$$\sqrt{\frac{1}{2}[(\sigma_1-\sigma_2)^2+(\sigma_2-\sigma_3)^2+(\sigma_1-\sigma_3)^2]} = \sigma_{ci}\left(\frac{m_b}{\sigma_{ci}}(\omega\sigma_2+(1-\omega)\sigma_3)+s\right)^a$$

where $\sigma_1$ is the maximum principal stress at failure; s and a depend on fracture geometry and surface conditions; $m_b$ depends on the fracture and intact rock matrix properties; $\omega(0 \leq \omega \leq 1)$ is the weight term that quantifies the different degrees of the effects of the intermediate principal stress, $\sigma_2$, and the minimal principal stress, $\sigma_3$, on the shear failure of the rock formation; $\sigma_{ci}$ is the unconfined compressive strength; and the term of $\omega\sigma_2+(1-\omega)\sigma_3$ on the right side of equation is the average confining stress during a poly-axial test.

12. The medium according to claim 11, wherein the failure criterion is a modified Hoek-Brown failure criterion.

13. The medium according to claim 11, wherein the failure criterion comprises an intermediate principal stress.

14. The medium according to claim 11, wherein the failure criterion comprises a difference between normal stresses and an average confining stress.

15. The medium according to claim 11, wherein the failure criterion is configured to determine that shear failure occurs when the term of the normal stress differences reaches a predetermined value that is dependent on the unconfined compressive strength ($\sigma_{ci}$) of the rock formation, rock matrix and fracture properties ($m_b$, s, a), and the average confining stress, $\omega\sigma_2+(1-\omega)\sigma_3$.

* * * * *